No. 889,992. PATENTED JUNE 9, 1908.
G. P. VAN WYE.
VACUUM BOTTLE AND CASING.
APPLICATION FILED OCT. 11, 1907.
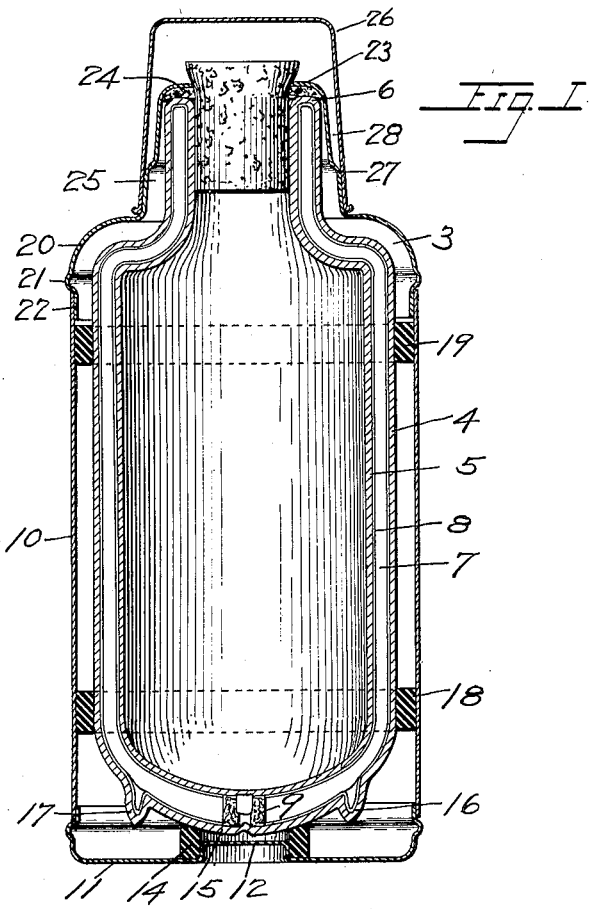
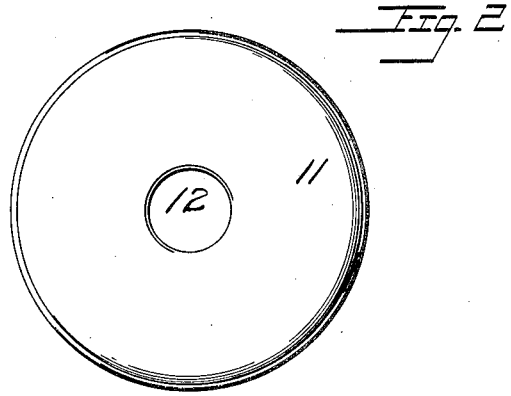
Witnesses:
Inventor
Garry P. Van Wye

UNITED STATES PATENT OFFICE.

GARRY P. VAN WYE, OF NEW YORK, N. Y.

VACUUM-BOTTLE AND CASING.

No. 889,992.  Specification of Letters Patent.  Patented June 9, 1908.

Application filed October 11, 1907. Serial No. 396,985.

*To all whom it may concern:*

Be it known that I, GARRY P. VAN WYE, a citizen of the United States, residing at New York, in the county and State of New York, have invented a new and useful Vacuum-Bottle and Casing, of which the following is a specification.

This invention relates to insulated bottles used in retaining the contents thereof in either a hot, or cold state, and has for its object to provide a bottle made of glass, or other fragile material, and so construct a case therefor that the bottle will not be easily broken; a further object being to provide a casing that will be tight against leakage, and which can be readily opened to replace the bottle should it become broken, or otherwise damaged; another object being to so construct the casing and drinking cup that the drinking cup will be firmly held in position as a protection to the cork, but in such a manner that it can be readily removed.

The invention is illustrated in the accompanying drawing, in which,—
Figure 1, is a vertical section of a vacuum bottle, and of my improved casing applied thereto; and, Fig. 2, is a bottom plan view of the casing.

In the drawing, like numerals of reference refer to the same parts in each of the views; and in practice I provide a bottle 3, consisting of an outer part 4, and inner part 5, connected at the lip 6, and inclosing a vacuum space 7, the walls of which are provided with a coating of silver 8; and the inner part 5, being supported and braced at the bottom by a tube, or block 9, of asbestos, or similar material.

As these bottles are usually made of very thin glass they are very easily broken, especially as they are usually supported within the casing by plaster of paris which connects the neck of the bottle with the casing, the rest of the bottle being suspended therefrom.
Then, too, when a bottle is broken, or the effectiveness is impaired by reason of the impairment of the vacuum, it is desirable to have a casing that can be readily removed from the bottle, and a new bottle inserted.
At the same time, it is desirable to have a casing mounted upon the bottle in a tight enough manner as to exclude the entrance of any liquid between the casing and bottle, and which will be held together firmly enough to prevent separation in ordinary handling. I have overcome these objections, and met these requirements by the construction shown in which a cylinder 10, is provided with a bottom 11, which is preferably secured therein, but it is evident that the parts 10, and 11, may be made in one piece. In the center of the bottom 11, I form an upwardly projection 12, on which I mount an elastic support 14, sufficient in length to engage the bottom 15, of the bottle, and hold the bottle sufficiently above the bottom of the casing to prevent the teats 16, and 17, coming in contact therewith, or any part of the bottle, and the bottle rests upon this support 14, which is preferably a ring, as shown, and engages the bottom of the bottle immediately adjacent to the support 9, between the two parts so that these two supports coact to support the inner part 5, of the bottle, as will be readily understood. I also provide an elastic support, or cushion between the sides of the bottle and the casing.

As shown in the drawing, two cushions are used, consisting of two rubber bands 18, and 19, which are proportioned in thickness to hold the bottle firmly in place, and these cushions assist the support 14, in supporting the bottle, and in protecting the same from any jar or shock of an ordinary nature.

To complete the top of the casing, I provide a piece 20, which is preferably provided with a rib 21, below which is an extension 22, adapted to fit closely within the top of the cylinder 10, and of sufficient length to create sufficient friction to prevent of ready dislodgment the rib 21, being adapted to engage the top of the cylinder 10, to prevent the further entrance of the part 20, and also for appearance sake.

Between the lip 6, of the bottle, and the inwardly extending flange 23, of the part 20, I mount a cork washer, or gasket 24; and the part 20, is so proportioned in length that when the rib 21, of the part 20, is in contact with the top of the cylinder 10, the washer will be compressed between the flange 23, and lip 6, sufficiently to prevent the entrance of any liquid between the bottle and the casing; and this washer will also act as a cushion to resist shock to the bottle, as will be readily understood. It will also be understood that the resistance between the extension 22, and the top of the cylinder 10, must be sufficient to hold the washer 24 in a compressed condition. At the same time, as the part 20, and cylinder 10, are held together only by friction, it is evident that they may be readily separated for the insertion of another bottle.

It will thus be seen that I have provided a casing that will be perfectly tight, and which will be quite effective in protecting the bottle from shock. Then, too, in practice I find that when a hot liquid, or beverage is stored in the bottle, the principal loss of heat is by conduction, the heat traveling up the neck of the inner part, around the lip, and down the neck of the outer part. Where the neck of the outer part is connected with the casing by plaster of paris, or similar material, this material will become heated, and convey the heat to the casing where it will be rapidly radiated thereby aiding in dissipating the heat of the contents of the bottle. In my construction, however, the only part contacting with the bottle at the top is the washer 24, which engages the lip only, and when the heat has traveled around the lip, 6, and into the neck of the outer part, it will not be conveyed to the casing except through the air space 25, and this air space will afford a much better protection against loss of heat than the plaster. In this way I am able to make the bottle more effective in storing heat.

I also provide a drinking cup, and cork protector 26, and the part 20, has a stepped side 27, so constructed that only a part of the side will come in contact with the wall of the cup, a space 28, being left so that the cup may be readily tilted to assist in the easy removal. I also prefer to make the part 27, sufficiently large so that there will be a slight spring action of the same when the cup 26 is forced thereon, and this will assist in holding the cup in place.

Having thus described my invention, what I claim as new and desire to secure by Letters Patent, is—

1. A vacuum bottle comprising two parts of easily breakable material having a vacuum space between them, and a casing mounted thereon, said bottle being provided with a sealing teat; an elastic support to sustain said bottle within the casing, and means to hold said support free from contact with said teat.

2. A vacuum bottle and casing, said bottle comprising two parts of easily breakable material having a vacuum space between them, and a casing mounted thereon, said casing having a projection in the bottom thereof, an elastic support mounted around said projection, and said bottle being mounted on said support, and also being cushioned within said casing.

3. A vacuum bottle and casing, said bottle comprising two parts of easily breakable material, an elastic support to sustain said bottle within the casing, and an elastic washer mounted between the lip of the bottle and the casing, said casing being free from contact with the neck of said bottle.

4. A vacuum bottle comprising two parts of easily breakable material with a vacuum space between them, and a casing of two readily separable parts mounted thereon, said bottle being elastically supported within said casing, and a washer mounted between the lip of said bottle and said casing.

5. A vacuum bottle comprising an outer and inner part of easily breakable material connected at the lip, a support mounted centrally between the bases of said parts, a casing mounted on said bottle, an elastic support mounted in the base of said casing and engaging the outer part adjacent to said support between the parts, and means to hold the outer support in position.

6. A vacuum bottle comprising two parts of easily breakable material with a vacuum space between them, and a casing of two readily separable parts mounted thereon, said bottle being elastically supported within said casing free from contact therewith, and a washer mounted between the lip of said bottle and said casing.

7. The herein described vacuum bottle and casing, comprising a bottle composed of easily breakable material with a vacuum space between the outer and inner part, and a casing of separable parts, the bottom of said casing having a central projection, an elastic ring mounted around said projection, and said bottle being mounted on said ring, elastic bands between the sides of said bottle and the casing, and an elastic washer mounted between the lip of the bottle and the casing said casing being free from contact with the bottle.

In testimony whereof I have signed my name to this specification in the presence of two subscribing witnesses.

GARRY P. VAN WYE.

Witnesses:
SADIE MULLANE,
ADELE V. JUILLERAT.